US005567310A

United States Patent [19]

Nakashima

[11] Patent Number: 5,567,310
[45] Date of Patent: Oct. 22, 1996

[54] STRAINER INCLUDING ROTATABLE CLOSURE MEMBER FOR FLUID SHUT OFF DURING FILTER DISPLACEMENT

[75] Inventor: Yoshihiko Nakashima, Wakayama, Japan

[73] Assignee: Noritsu Koki Co., Ltd., Wakayama, Japan

[21] Appl. No.: 621,940

[22] Filed: Mar. 26, 1996

[30] Foreign Application Priority Data

Apr. 11, 1995 [JP] Japan .................................. 7-085340

[51] Int. Cl.⁶ .................................................. B01D 27/08
[52] U.S. Cl. ........................... 210/235; 210/357; 210/359; 210/398
[58] Field of Search ................................... 210/232, 235, 210/238, 357, 359, 398, 435, 437, 453, 459

[56] References Cited

U.S. PATENT DOCUMENTS

| | | | |
|---|---|---|---|
| 2,331,119 | 10/1943 | Gouldbourn et al. | 210/235 |
| 3,715,032 | 2/1973 | Nicko | 210/234 |
| 4,139,468 | 2/1979 | Rosaen | 210/235 |
| 4,303,514 | 12/1981 | Theorell | 210/235 |

FOREIGN PATENT DOCUMENTS 2824346  12/1979  Germany .................... 210/235

*Primary Examiner*—W. L. Walker
*Attorney, Agent, or Firm*—Wenderoth, Lind & Ponack

[57] ABSTRACT

A strainer includes a filter which is easily detachable without the possibility of fluid leakage. The strainer has a housing defining a bore and is formed with a fluid inlet and outlet, and an end plate formed with a circular hole and cutouts provided along the edge of the circular hole, opposite to each other. A closure member is rotatably mounted in the bore of the housing and is formed with a passage through which the inlet and the outlet can communicate with each other, and a filter mounting hole. A filter is detachably inserted in the filter mounting hole. It has a flange and a knob formed with a protrusion. The edge of the circular hole is sandwiched between the protrusion and the flange. By turning the knob, the closure member can be turned to a position where it closes both the inlet and outlet. By pulling the knob in this state, the filter can be pulled out of the filter mounting hole for cleaning or replacement.

1 Claim, 5 Drawing Sheets

STRAINER INCLUDING ROTATABLE CLOSURE MEMBER FOR FLUID SHUT OFF DURING FILTER DISPLACEMENT

BACKGROUND OF THE INVENTION

This invention relates to a strainer mounted in a liquid flow passage for filtering liquids flowing through the passage.

An automatic photographic developing machine develops photosensitive materials by passing them through treating tanks filled with various treating solutions such as developing, bleaching, fixing, stabilizing solutions. Replenishing tanks are connected to the respective treating tanks through supply pipes to refill them with solutions by activating pumps connected to the supply pipes.

A strainer is usually provided in a pipe line connected to the inlet of each supply pipe to filter the treating solution before feeding it into the treating tank.

When the filter of such a strainer is clogged, the filtering efficiency drops. Thus, it is necessary to periodically remove and clean the filter or replace it with a new one by removing it from the strainer housing.

Such a conventional strainer is mounted in the supply pipe at its portion connected to the inlet of the pump. In order to remove the filter of such a strainer, the entire strainer has to be dismounted from the pump after disconnecting the supply pipe.

If the pipe is disconnected with treating solution remaining in the pipe, the solution in the pipe will spill out, polluting the surroundings. Thus, before disconnecting the pipe, it is necessary to discharge any treating solution remaining in the pipe or close the pipe with a pinch cock or any other closure means. It is thus extremely troublesome to remove the filter for cleaning or replacement.

An object of this invention is to provide a strainer which permits easy cleaning or replacement of its filter.

SUMMARY OF THE INVENTION

According to this invention, there is provided a strainer comprising a housing having a peripheral wall defining a bore and formed with a fluid inlet and outlet, and an end plate formed with a circular hole and a pair of cutouts formed along the edge of the circular hole, diametrically opposite to each other. A closure member is rotatably mounted in the bore of the housing and is formed with a passage through which the inlet and the outlet communicate with each other, and a filter mounting hole intersecting the passage and having an opening at one end of the closure member. A filter is detachably inserted in the filter mounting hole, the filter having a flange which can pass through the cutouts, and a knob which protrudes outwardly through the circular hole of the housing when the filter is in the mounting hole, the knob having a protrusion spaced from the flange by a distance slightly larger than the thickness of the end plate of the housing. Means is provided for allowing the rotation of the closure member only within a range between a first position where the inlet and the outlet communicate with each other through the passage formed in the closure member and a second position where the inlet and the outlet are shut off from each other by the closure member. The flange of the filter is positioned to align with the cutouts when the closure member is in the second position.

By turning the knob, it is possible to turn the closure member to selectively open and close the inlet and outlet formed in the housing. When the inlet and the outlet are closed by the closure member, the flange of the filter aligns with the cutouts. Thus, the filter can be removed for cleaning or replacement from the housing by pulling the knob, while preventing leakage of the fluid in the pipe.

Other features and objects of the present invention will become apparent from the following description made with reference to the accompanying drawings, in which:

DETAILED DESCRIPTION OF THE PREFERRED EMBODIMENT

The embodiment of this invention is now described with reference to the drawings.

Figure 1:
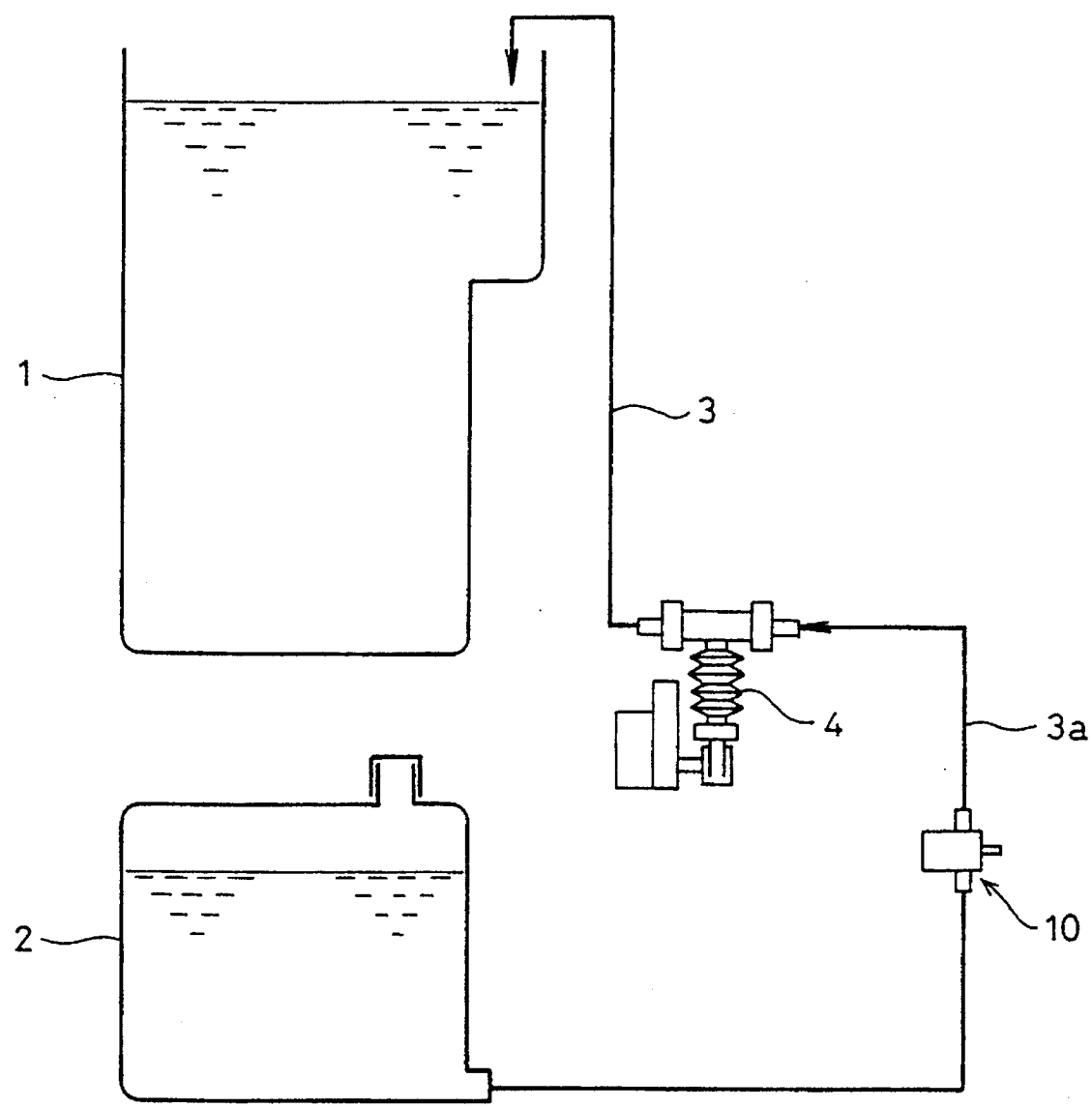
FIG. 1 is a schematic view of a treating solution replenishing device including the strainer according to this invention.
Figure 2:
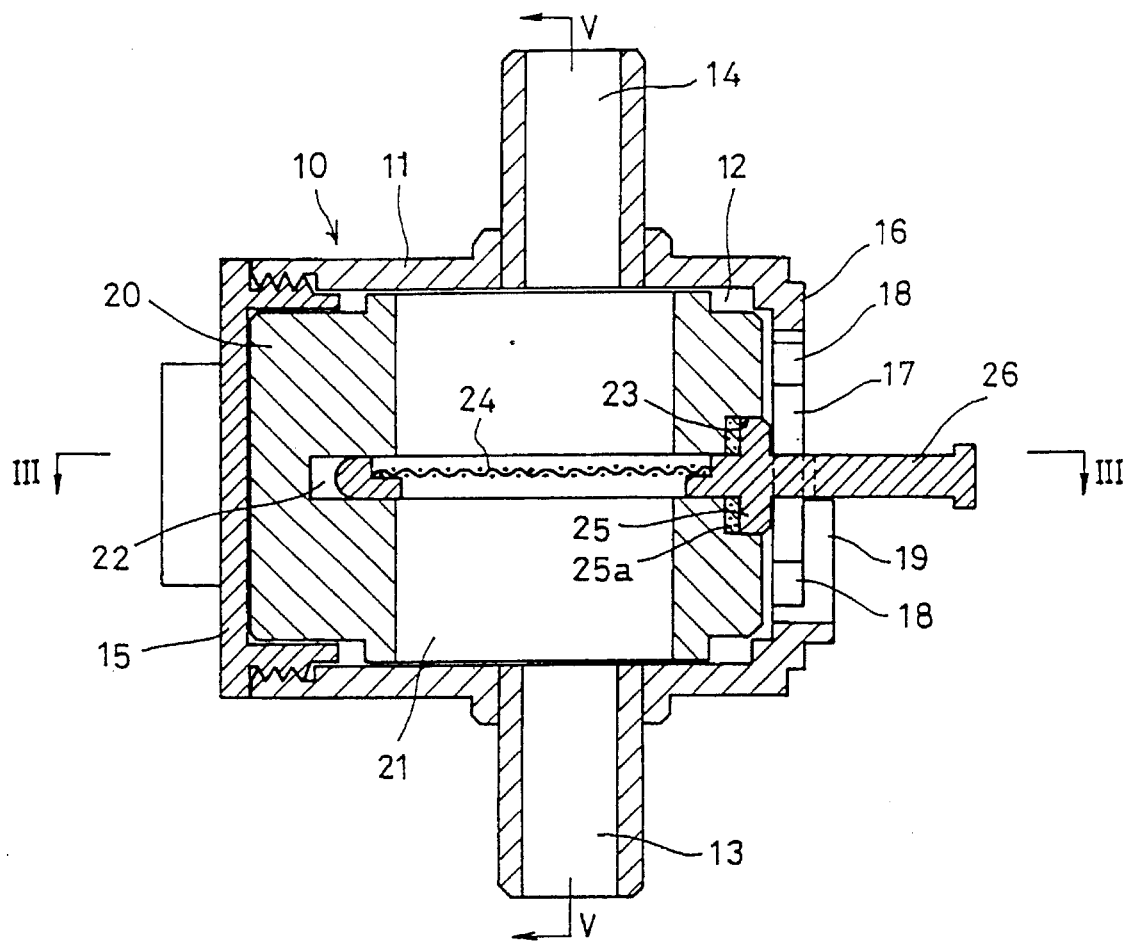
FIG. 2 is a vertical sectional front view of the strainer of FIG. 1.

FIG. 1 shows a treating solution replenishing device for use in an automatic developing machine for developing photosensitive materials. A treating tank 1 is connected with a replenishing tank 2 via a supply pipe 3. By activating a pump 4 provided in the supply pipe 3, the treating solution in the replenishing tank 2 is fed into the treating tank 1.

A strainer 10 according to this invention is provided in a pipe section 3a connected to the inlet of the pump 4.

FIGS. 2 through 6 show the details of the strainer 10. It includes a housing 11 having a cylindrical bore 12 and an inlet 13 and an outlet 14 opening to the bore 12 on opposite sides of the bore.

The bore 12 has an opening at one end of the housing 11 into which is screwed a cap 15.

Figure 6:
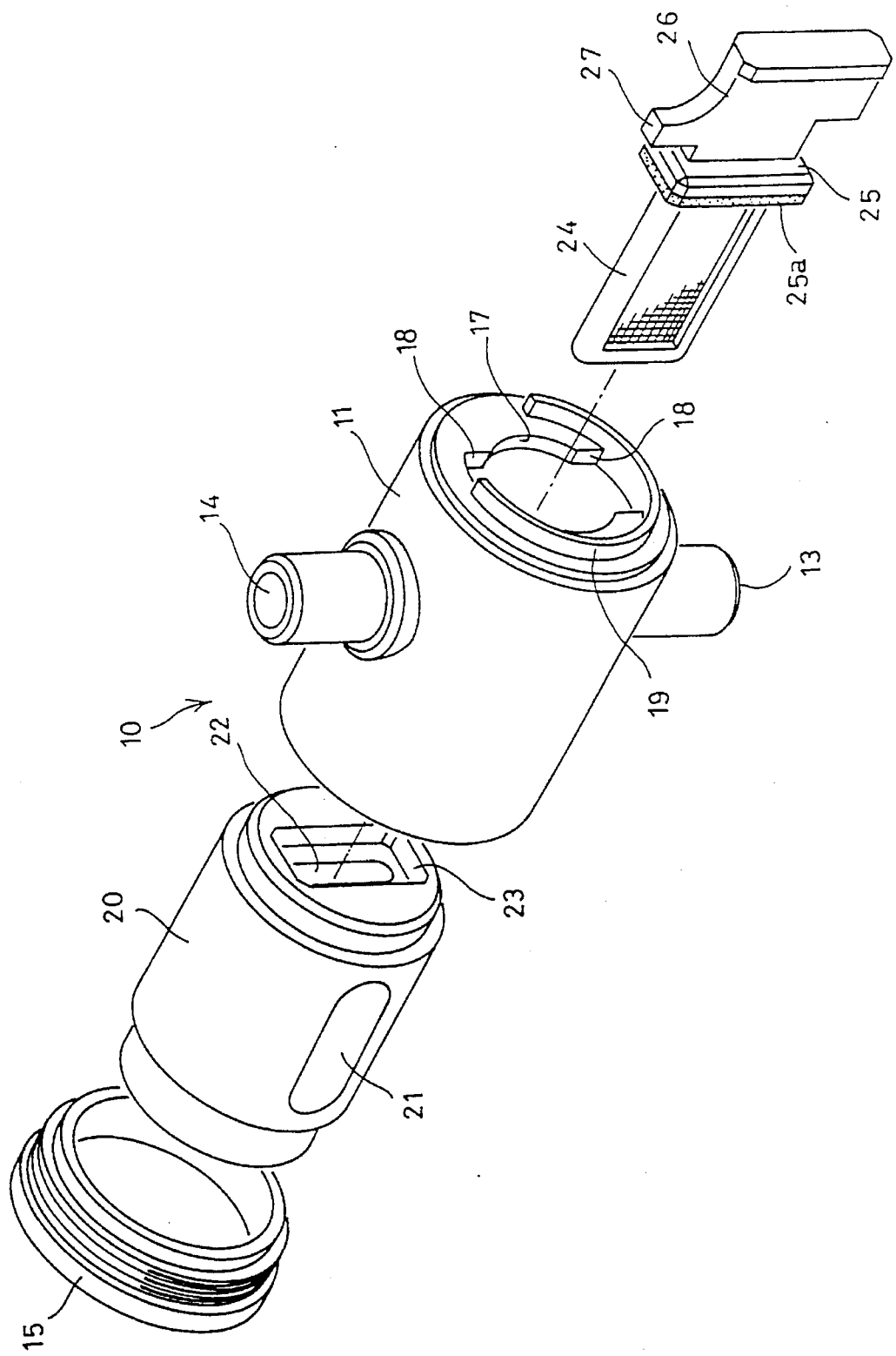
FIG. 6 is an exploded perspective view of the same.
Figure 7:
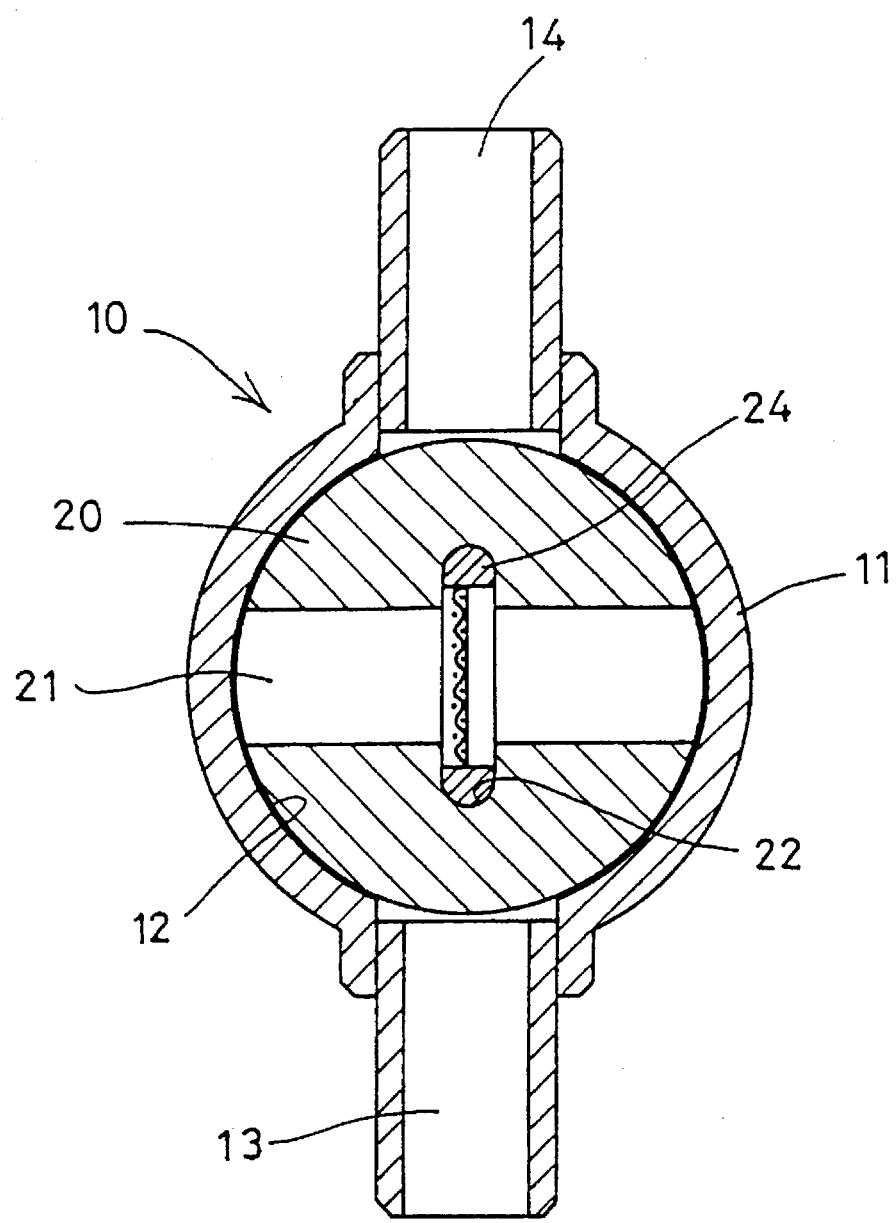
FIG. 7 is a sectional view of the strainer in which the inlet and the outlet are closed by the closure member.

The housing 11 has an end plate 16 formed with a circular hole 17. Cutouts 18 are formed along the edge of the hole 17 (FIG. 4), diametrically opposite to each other. A rib 19 in the shape of a circular arc is formed on the outer surface of the end plate 16 (FIG. 6).

A closure member 20 is mounted in the bore 12 of the housing 11. It has a passage 21 through which the inlet 13 communicates with the outlet 14, and a flat rectangular filter housing hole 22 that intersects the passage 21 and opens at one end of the closure member 20.

A flange-receiving recess 23 is formed in one end of the closure member 20.

A filter 24 is inserted in the hole 22 with its flange 25 received in the recess 23 so that its packing 25a is sandwiched between the flange 25 and the bottom of the recess 23. The flange 25 has to be so small that it can pass through the cutouts 18. A knob 26 provided on the outer side of the flange 25 protrudes outwardly through the circular hole 17 of the housing 11.

Figure 3:
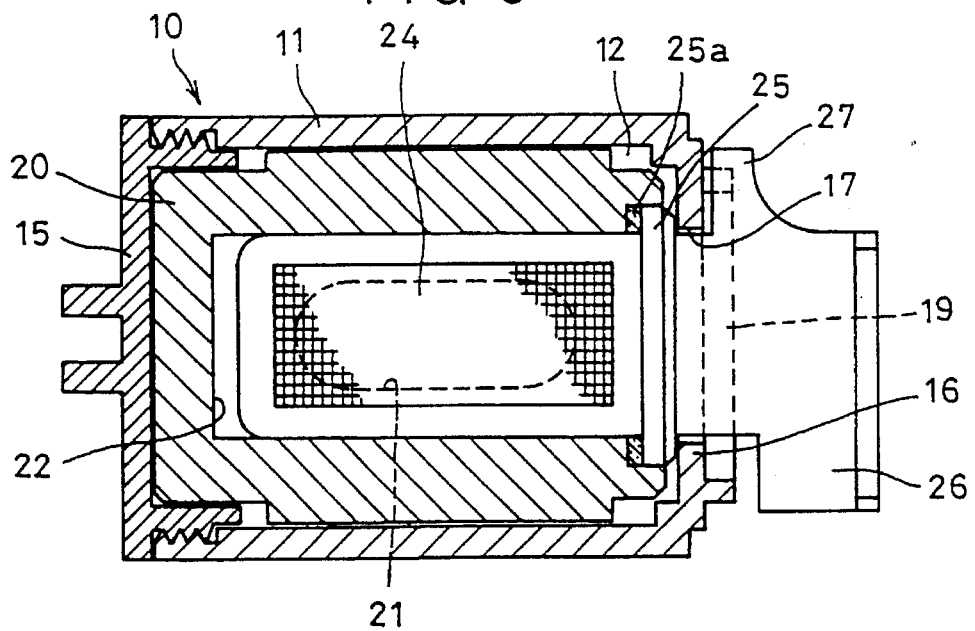
FIG. 3 is a sectional view taken along line III—III of FIG. 2.
Figure 4:
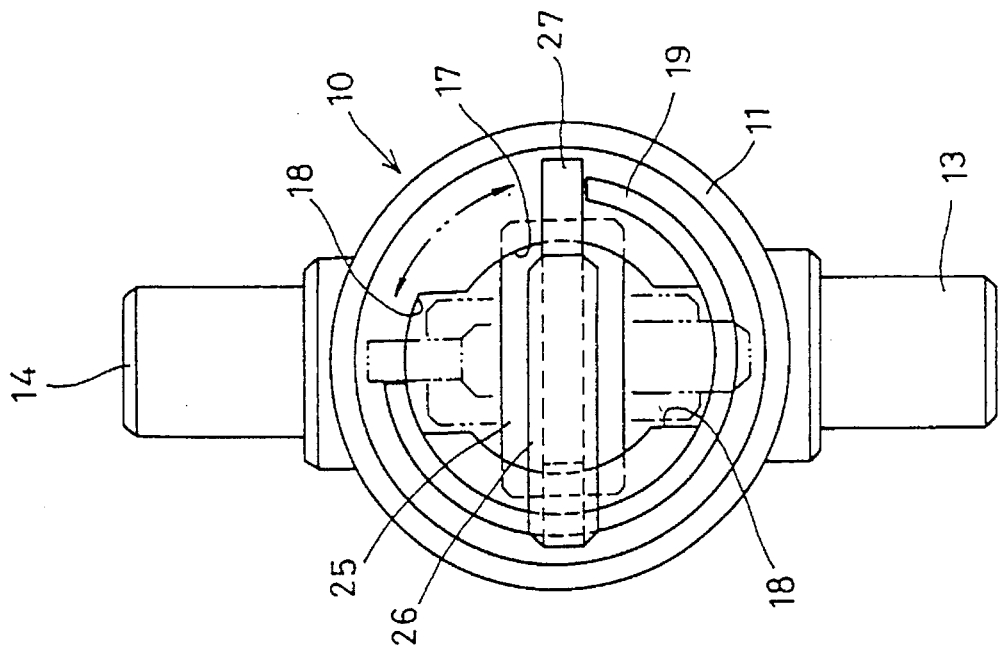
FIG. 4 is a side view of the same.
Figure 5:
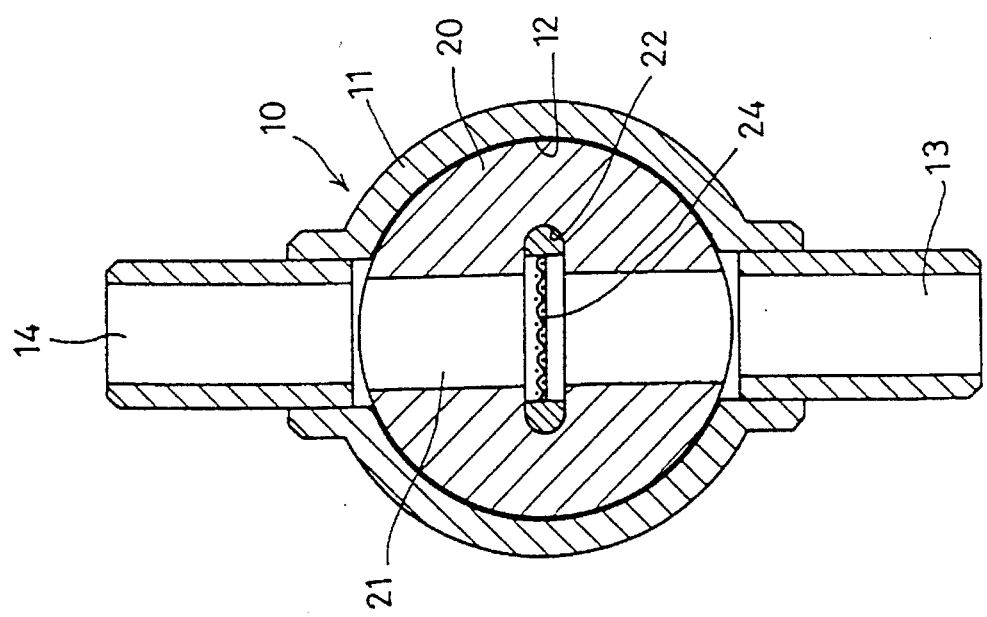
FIG. 5 is a sectional view taken along line V—V of FIG. 2.

By holding and turning the outwardly protruding knob 26, it is possible to turn the closure member 20. The knob 26 has a protrusion 27 spaced from the flange 25 by a distance equal to the thickness of the end plate 16 of the housing 11 (FIG. 3). The protrusion 27 can abut both ends of the rib 19. When the protrusion 27 abuts one end of the rib 19, the passage 21 of the closure member 20 is so positioned that the inlet 13 communicates with the outlet 14 through the passage 21.

When the protrusion 27 abuts the other end of the rib 19, the inlet 13 and the outlet 14 are shut off from each other by the closure member 20. In this state, the flange 25 of the filter 24 is positioned opposite to the cutouts 18.

FIG. 3 shows the state in which the inlet 13 and the outlet 14 communicate with each other through the passage 21. In this state, the edge of the circular hole 17 is sandwiched between the flange 25 of the filter 24 and the protrusion 27. The filter 24 is thus unable to come out of the housing.

By activating the pump 4 shown in FIG. 1 with the inlet 13 and the outlet 14 communicating with each other, the treating solution in the replenishing tank 2 will flow through the supply pipe 3. By passing through the filter 24, the treating solution is filtered. The thus filtered treating solution is fed into the treating tank 1.

When the filter 24 is clogged and the filtering efficiency drops, the filter 24 is removed while the pump is inoperative to clean it or replace it with a new one.

The filter 24 can be removed by turning the knob 26 until its protrusion 27 abuts the other end of the rib 19.

When the protrusion 27 abuts the other end of the rib 19, the inlet 13 and the outlet 14 of the housing 11 are shut off from each other by the closure member 20. Since the flange 25 is in alignment with the cutouts 18 in this state, the filter 24 can be pulled out of the bore 22.

The cleaned filter 24 or a new filter 24 is inserted through the circular hole 17 into the bore 22 until the flange 25 of the filter 24 is received in the recess 23. Then, the knob 26 is turned until the protrusion 27 of the knob 26 abuts the one end of the rib 19.

When the protrusion 27 abuts the one end of the rib 19, the passage 21 in the closure member 20 moves to the position where it communicates with both the inlet 13 and the outlet 14. That is, the inlet 13 and the outlet 14 communicate with each other. In this state, the edge of the circular hole 17 is disposed between the flange 25 and the protrusion 27 as shown in FIG. 3, so that the filter 24 can be retained in the bore 22.

In the embodiment, the flange-receiving recess 23 is formed in one end of the closure member 20. But instead of this recess 23, a gap of a size corresponding to the thickness of the flange 25 may be provided between the end of the closure member 20 and the inner surface of the end plate 16 of the housing 11.

The strainer according to the present invention may be used not only in a treating solution replenishing device as in the above embodiment, but also for other devices or purposes.

With this arrangement, it is possible to remove the filter for cleaning or replacement while preventing leakage of fluid in the pipe without the need to disconnect the pipe connected to the inlet or outlet.

By sandwiching the edge of the circular hole between the flange and the protrusion, it is possible to keep the filter from coming out of the housing.

What is claimed is:

1. A strainer comprising a housing having a peripheral wall defining a bore and formed with a fluid inlet and outlet, and an end plate formed with a circular hole and a pair of cutouts formed along the edge of said circular hole, diametrically opposite to each other, a closure member rotatably mounted in said bore of said housing and formed with a passage through which said inlet and said outlet communicate with each other, and a filter mounting hole intersecting said passage and having an opening at one end of said closure member, a filter detachably inserted in said filter mounting hole, said filter having a flange which can pass through said cutouts, and a knob which protrudes outwardly through said circular hole of said housing when said filter is in said mounting hole, said knob having a protrusion spaced from said flange by a distance slightly larger than the thickness of said end plate of said housing, and a means for allowing the rotation of said closure member only within a range between a first position where said inlet and said outlet communicate with each other through said passage formed in said closure member and a second position where said inlet and said outlet are shut off from each other by said closure member, said flange of said filter being positioned so as to align with said cutouts when said closure member is in said second position.

* * * * *